United States Patent
Gilbert et al.

(10) Patent No.: US 7,203,298 B2
(45) Date of Patent: Apr. 10, 2007

(54) CALL COMPLETION SERVICES FOR HYBRID PUBLIC/PRIVATE COMMUNICATIONS NETWORKS

(75) Inventors: Leroy Edwin Gilbert, Wellington, FL (US); Robert W. Callaghan, Prescott, AZ (US)

(73) Assignee: Siemens Communications, Inc., Boca Raton, FL (US)

( * ) Notice: Subject to any disclaimer, the term of this patent is extended or adjusted under 35 U.S.C. 154(b) by 689 days.

(21) Appl. No.: 10/385,226

(22) Filed: Mar. 10, 2003

(65) Prior Publication Data
US 2004/0179668 A1    Sep. 16, 2004

(51) Int. Cl.
*H04M 3/42* (2006.01)

(52) U.S. Cl. .................. 379/209.01; 379/207.04; 379/210.01

(58) Field of Classification Search .......... 379/207.04, 379/207.05, 207.06, 207.08, 209.01, 210.01
See application file for complete search history.

(56) References Cited

U.S. PATENT DOCUMENTS

| | | | | |
|---|---|---|---|---|
| 4,166,929 A | * | 9/1979 | Sheinbein | 379/209.01 |
| 6,208,723 B1 | * | 3/2001 | Frey, Jr. | 379/201.01 |
| 6,546,096 B1 | * | 4/2003 | Meiden et al. | 379/209.01 |
| 6,687,359 B1 | * | 2/2004 | D'Arcy et al. | 379/209.01 |
| 6,882,719 B2 | * | 4/2005 | Lee | 379/209.01 |
| 6,882,720 B2 | * | 4/2005 | Booton | 379/209.01 |

* cited by examiner

Primary Examiner—Bing Q. Bui

(57) ABSTRACT

A communications network with callback completion to public network stations. An enterprise private network (EPN) includes a communications server, e.g., a private branch exchange (PBX) managing communications with communications devices located at EPN stations and is connected to a public communications network. A call completion (CC) server connected through a Parlay Gateway to the public communications network manages callback requests from connected communications devices to public communications network stations. Call completion to busy subscriber (CCBS) and call completion on no reply (CCNR) services are thus made available from the EPN to the public network or networks including a mixture of public and private telephones.

35 Claims, 3 Drawing Sheets

CALL COMPLETION SERVICES FOR HYBRID PUBLIC/PRIVATE COMMUNICATIONS NETWORKS

BACKGROUND OF THE INVENTION

1. Field of the Invention

The present invention is related to private communications networks and more particularly, to providing call completion services between a private communications network and a public communication network.

2. Background Description

A private communications network, such as a private voice network, is a full featured telephone network. A typical private communications network may include, for example, a communications server or private branch exchange (PBX) server linking together wire connected digital phones for a particular enterprise, e.g., phones located in offices on a common campus. The digital phones may be cordless to allow some mobility within a specific local area and sometimes are Internet protocol (IP) based for easy expansion, e.g., simply by connecting extra IP phones. Private communications network users can share both data and voice based information across the private network to improve productivity.

One such feature included in a typical private communications network is the callback service. When a call does not complete, i.e., the called number is busy or the called party does not answer, the caller can request a "callback." Thereafter, the PBX server monitors the status of the called number until a connection is deemed possible, e.g., when the called party next goes on-hook. Then, the PBX server rings the caller back and automatically connects the caller to the desired destination.

A similar service is available in some public networks between the public network telephones. In this case when a caller calls a busy destination, some public networks play an announcement to the caller such as "The party you have called is busy. For 50 cents we will continue to try this party for you and ring you when your party is available." If such a service is unavailable, callers may resort to using an intelligent telephone that continuously redials until it completes the call. However, this wastes network resources and can be expensive for the user. "Repeat dialers" are commercially available but are illegal in some areas and can lead to additional telephone charges. Thus, all of these callback solutions can be expensive.

Call control messaging protocols have standardized between European public and private telephone networks. This protocol standardization permits using standard call control methods for callback features. However, using these protocols requires that all switching nodes (public and private) involved in the call know the special protocols. There is no such mechanism in current North American telephone systems to provide callback services in mixed private/public networks, i.e., where one party is at a public network telephone and the other is at a private network telephone.

Thus, there is a need for an improved callback service between private communications networks and public network users.

SUMMARY OF THE INVENTION

It is a purpose of the invention to extend private communications network callback services beyond private communications network users;

It is another purpose of the invention to provide private network users with an inexpensive callback completion service to and from out of network, public network stations.

The present invention relates to a communications network capable of providing callback completion services between stations on a private network and public network stations. An enterprise private network (EPN) includes a communications server, e.g., a private branch exchange (PBX) managing communications with communications devices located at EPN stations and is connected to a public communications network. A call completion (CC) server is connected to the PBX through a computer telephony interface (CTI, e.g., a Computer Supported Telecommunications Applications (CSTA) link) and through an Intelligent Network Gateway (e.g., a Parlay Gateway) to the public communications network. The CC server manages callback requests from connected communications devices in the public and private communications network. Call completion to busy subscriber (CCBS) and call completion on no reply (CCNR) services are thus made available from the EPN to the public network or networks including a mixture of public and private telephones.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
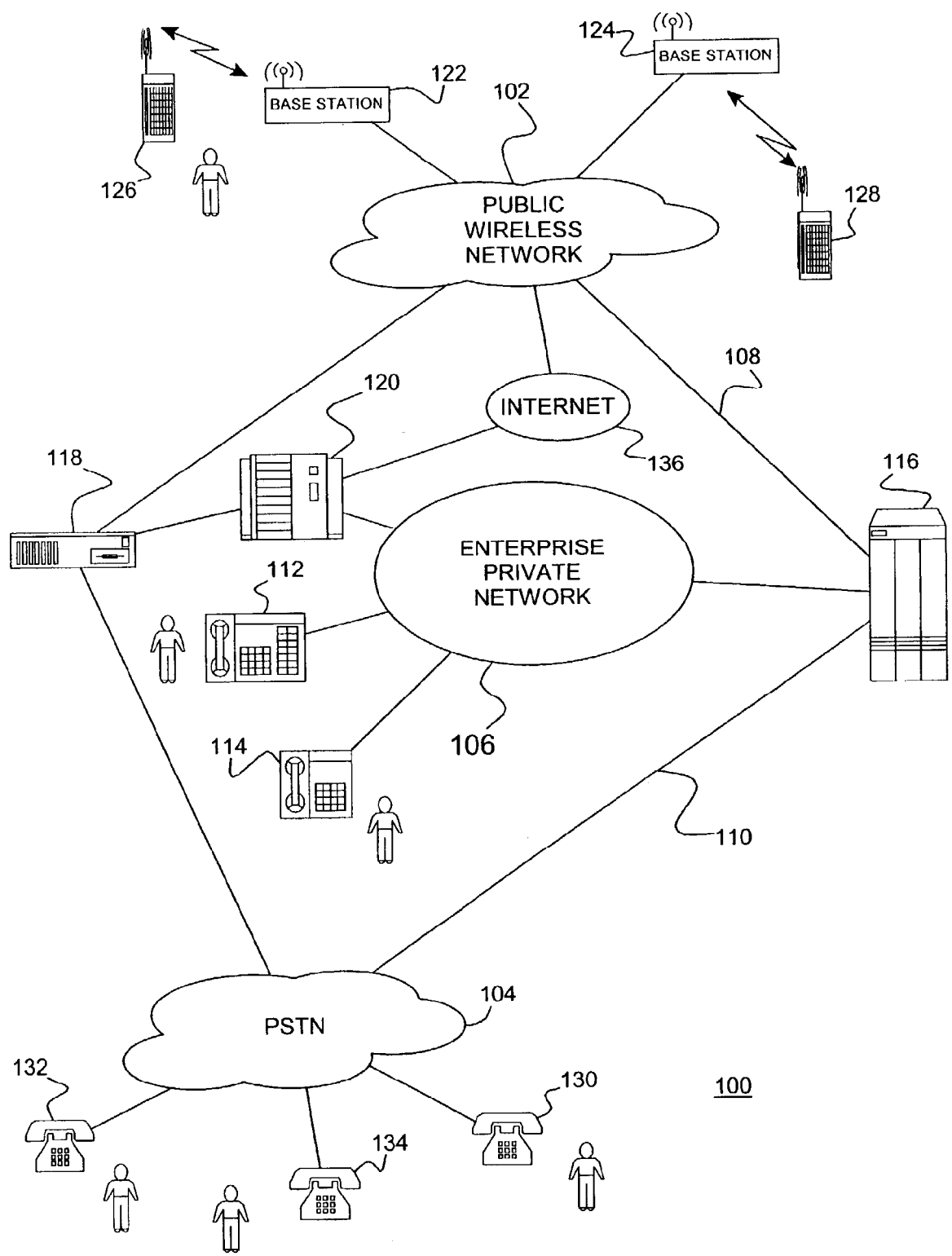
FIG. 1 shows an example of a preferred embodiment private communications network.

Turning now to the drawings and more particularly, FIG. 1 shows an example of a preferred embodiment communications network 100. A public wireless network (PWN) 102 and a public switched telephone network (PSTN) 104 connect to an Enterprise Private Network (EPN) 106 over a standard telephony connection 108, 110, respectively. The connections 108, 110 between public network (102, 104 collectively) and EPN 106, each may be an integrated services digital network (ISDN) line, for example. The EPN 106 includes one or more digital communications devices at individual EPN stations 112, 114. One or more communications network servers 116, e.g., a private branch exchange (PBX), manages private communications over the EPN 106. A Gateway 118 at a call completion (CC) server 120 connects the EPN 106 to the public networks 102, 104.

State of the art public communications networks (e.g., mobile networks 102 and wire-line networks 104) include feature control overlays and are known in the art as Intelligent Networks (IN) or Advanced Intelligent Networks (AIN). Each IN and AIN includes feature servers in the public communications networks 102, 104 to control access, call routing and other features for connected telephones. An industry development group known as Parlay (See, e.g., www.parlay.org) has extended the applicability of both IN and AIN feature control overlays to private enterprise services e.g., EPN 106. Thus, preferably, the gateway 118 is a Parlay gateway 118.

The Parlay Gateway 118 to the public network carriers 102, 104 permits an external server to monitor and influence operation of specific telephones in the public network. Also, the Parlay Gateway 118 manages special billing scenarios (e.g. pre-paid calling cards) and special routing scenarios (e.g. 800 services). Remotely located base stations 122, 124 connect wireless network client devices 126, 128, e.g., cell phones, to the public wireless network 102. PSTN clients 130, 132, 134 connect to the EPN 106 through PSTN 104. In particular, PSTN 104 may be the plain old telephone service (POTS) and clients 130, 132, 134 may be analog telephones connected to analog trunks. The CC server 120 on the EPN 106 manages EPN endpoint callback services involving public client devices 126, 128, 130, 132, 134. Also, the CC server 120 may have a digital connection to the PWN 102, e.g., over the internet 136.

Thus, according to a preferred embodiment of the present invention the Parlay gateway 118 enables the CC server 120 to request and receive real-time call status information regarding specific public telephones that participate in the Parlay service. Thus, the CC server 120 uses this information for public/private call completion to busy subscriber (CCBS) and call completion on no reply (CCNR) services. CCBS and CCNR heretofore have been unavailable in networks, especially in North America, including a mixture of public and private telephones.

In an alternate embodiment the CC server 120 connects digitally to PWN client devices 126, 128 though short message service SMS or its equivalent such as special e-mail message or, through an Internet protocol (IP) network message (e.g., over the Internet 136) to the PWN 102, which may be a comparatively low speed connection. Many newer cell phones (e.g., $3^{rd}$ generation (3G) devices) can install and run special applications, e.g., Java applets, that may be used for monitoring phone status. Thus, the present invention has application to nearly any occasion wherein device status information from multiple different public and private network sources is available to expand network services provided. In particular, the present invention has direct application to next generation IP based communications networks, e.g., to support 3G IP based mobile phones. Further, since these 3G phones do not require the Parlay gateway 118, this embodiment has application to even those private networks that do not include a Parlay gateway 118.

Figure 2:
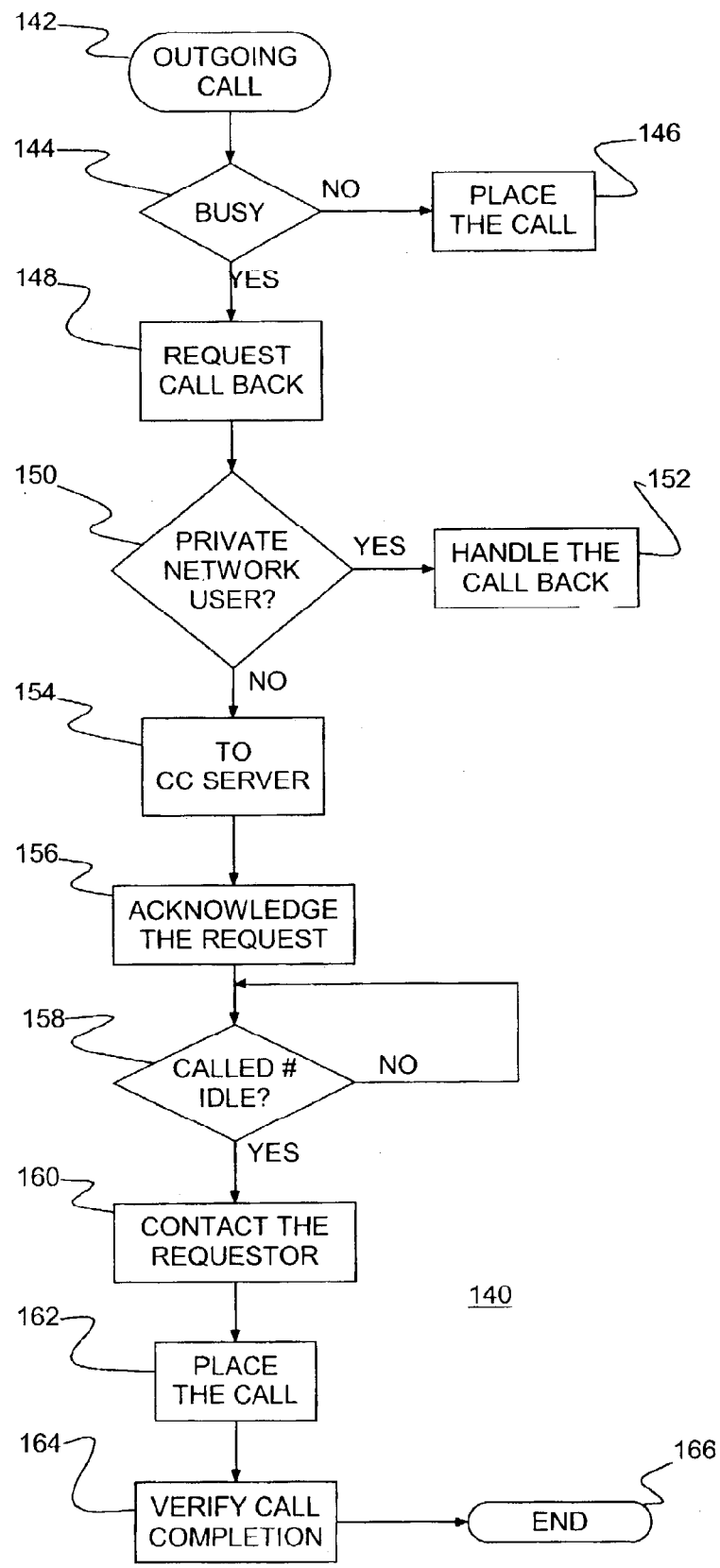
FIG. 2 shows an example of how the CC server provides CCBS service for telephones in a mixed public and private network with reference to FIG. 1.

FIG. 2 shows an example 140 of how the CC server 120 provides CCBS service for telephones in a mixed public network 102, 104 and private network 106 with reference to FIG. 1. In step 142 a private network subscriber or client e.g., 112, calls a public network subscriber at a public network station 126, 128, 130, 132 or 134 in a public telephone network 102, 104, e.g., cell phone 126 in public wireless network 102. In step 144 if the called station 126 is idle, then in step 146 the call completes normally. Otherwise in step 144, if the station is busy, then in step 148, the caller can request a callback through a computer telephony interface (CTI) e.g., a Computer Supported Telecommunications Applications (CSTA) link to the network server (PBX 116). The CTI may reside on the CC server 120. So, for example, if the private network subscriber/client 112 urgently needs to talk to public network subscriber/client, the caller depresses a button or dials a digit sequence, e.g., *#3, to request a callback when the public network subscriber 126 is no longer busy. In step 150, if the call is an in network call to another private network subscriber/client, e.g., 114, the CTI directs the PBX 116 to handle the request normally in step 152. Otherwise, in step 150 the CTI directs the PBX 116 determines that the call is out of network, i.e., to a public network subscriber or to another private network. A typical state of the art PBX server 116 is unable to provide this service to an out of network destination telephone 126, i.e., callback-when-free a station 126, 128, 130, 132 or 134 in a public telephone network 102, 104.

So, in step 154 the PBX 116 forwards the request to the CC server 120, which can monitor and control calls to public network associated telephones through information provided by the Parlay Gateway 118. In step 156 the CC Server 120 recognizes the callback feature request and instructs the PBX 116 to return a confirmation, e.g., audibly with a tone or visually with a display. Through the Parlay Gateway 118 the CC Server 120 requests that the public network 102, 104 begin monitoring the status of the called station 126, 128, 130, 132, 134, 130, i.e., that the wireless network 102 monitor cell phone 126 in this example. In step 158, the public network 102 continues to monitor the called station 126 until it goes on-hook and, therefore, is idle. When in step 158 the called number is idle, the public network 102 informs the CC server 120 of the status change. Next in step 160, the CC server 120 through the CTI link directs the PBX 116 to initiate a call from the requesting number to the out of network destination 126. The PBX 116 contacts the calling party, at station 112 in this example. When the calling party answers, the CC server 120 directs the PBX 116 to call the destination, cell phone 126 in this example. The CC server 120 detects ringing at the called station (cell phone 126) and so, an answer to the call. In step 164 the CC Server 120 verifies that the calling party 112 receives a valid answer signal from the called station 126 to successfully complete the callback. Finally, optionally in step 166 the CC server 120 directs the Parlay Gateway 118 to stop sending detailed status information regarding the called station 126.

In an alternate embodiment, to device status monitoring begins in response to a request to the public network device itself, e.g., a short message service (SMS) message. Upon receipt of the SMS request, the public network device reports status directly to the CC server 120, e.g. with an SMS response. Optionally, public network devices may routinely and continuously report status to the CC server 120, making requests to begin monitoring unnecessary, since these devices are "always active."

Figure 3:
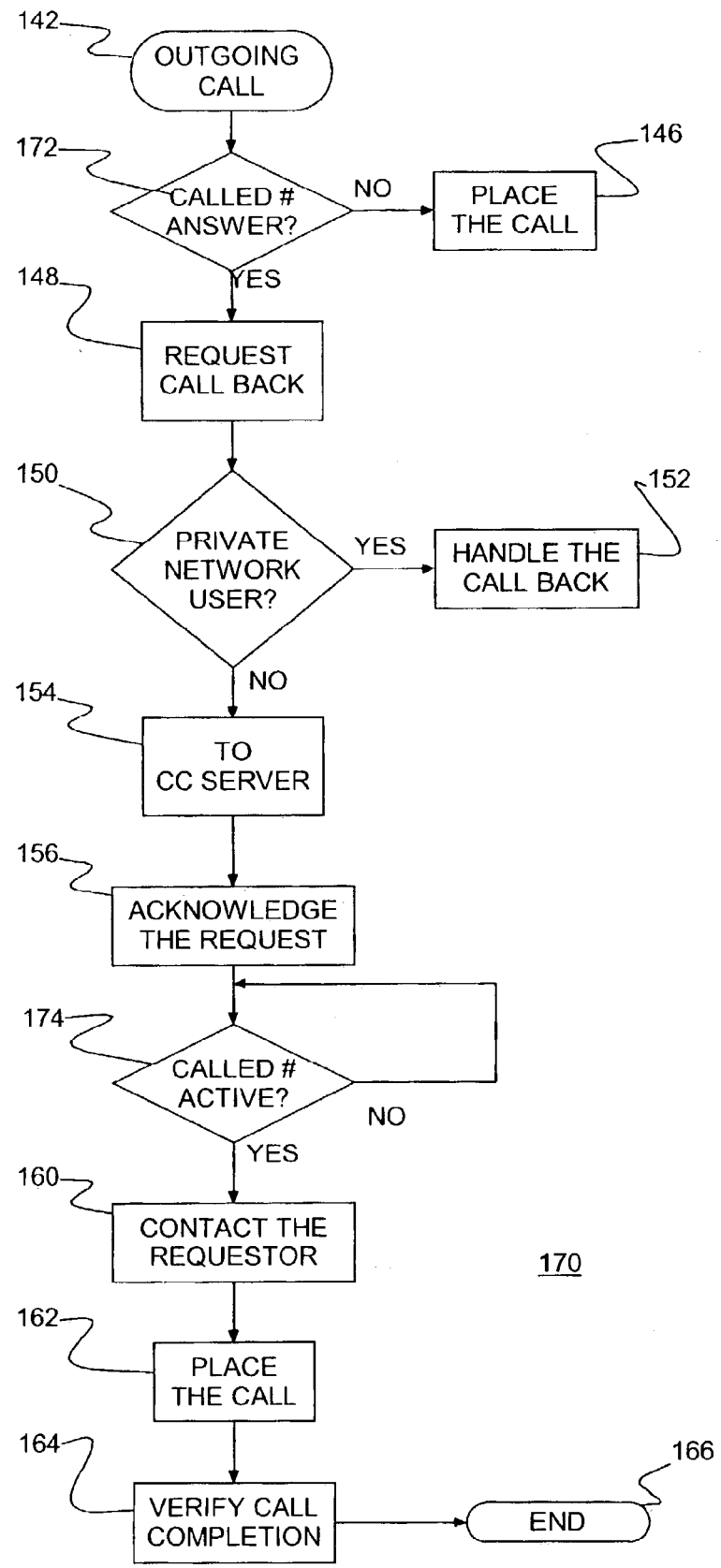
FIG. 3 shows an example of how the CC server provides CCNR service substantially similarly to FIG. 2.

FIG. 3 shows an example 170 of how the CC server 120 provides CCNR service for telephones in a mixed public network 102, 104 and private network 106 with reference to FIG. 1 and, which is substantially similar to FIG. 2 with like steps labeled identically. So, in step 142 a private network subscriber or client e.g., 112, calls a public network subscriber at a public network station 126, 128, 130, 132 or 134 in a public telephone network 102, 104, e.g., cell phone 126 in public wireless network 102. In step 172 if the called number 126 is idle and answers the call, then in step 146 the call completes normally. Otherwise in step 172, if someone at the called number does not answer, then in step 148, the caller can manually request a callback. The called number may not have voice mail service or the caller may prefer not to leave a voice mail message, e.g., because the private network subscriber/client 112 needs urgently to talk to someone at the public network station. So, the caller depresses a button or dials a digit sequence, e.g., *#3, to request a callback when someone at the public network subscriber phone 126 is available. Alternately, the callback request can be made automatically if the called destination fails to answer within a predefined time interval.

In step 150, if the call is an in-network call to another private network subscriber/client, e.g., 114, the private network server (PBX 116) handles the request normally in step 152. Otherwise, in step 150 the PBX 116 determines that the call is out of network, i.e., to a public network subscriber or to another private network. So, in step 154 the PBX 116 forwards the request to the CC server 120. In step 156 the CC Server 120 recognizes the callback feature request and instructs the PBX 116 to return a confirmation tone. In step 174 again through the Parlay Gateway 118, the CC Server 120 requests that the public network 102, 104 begin monitoring for activity on the called station 126, 128, 130, 132, 134 that indicates that someone is actively engaged with the called station 126, 128, 130, 132, 134. For example, wireless network 102 may monitor cell phone 126 activity such as whether the device is powering on or, the occurrence of an on-hook condition. So, in step 174 the public network 102 continues to monitor the called station 126 until activity is reported and, the called station is on hook. When in step 174 the called number is active, the public network 102 informs the CC server 120 and, in step 160 the CC server 120 directs the PBX 116 to initiate a call from the requesting number to the out of network destination 126. The PBX 116 contacts the calling party, again at station 112 in this example. When the calling party at station 112 answers, the CC server 120 directs the PBX 116 to call the monitored destination, again cell phone 126 in this example. The CC server 120 detects ringing at cell phone 126 and, also determines when the call is answered. So, in step 164 the CC Server 120 verifies that the calling party 112 receives a valid answer signal from the called station 126 to successfully complete the callback. Finally, optionally in step 166 the CC server 120 directs the Parlay Gateway 118 to stop sending detailed status information regarding the called station 126.

Although as described in the examples herein with initial call requests originating from private network devices, it is understood that public network stations can likewise place callback requests to private network destinations, instead of using a typical state of the art private network callback feature. For example, a public network caller, when hearing a busy signal, dials a special code (e.g., **67) which is detected by the (for example) Parlay gateway. The Parlay gateway informs the CC server of the user action, which then initiates monitoring of the private network destination. When the private network destination becomes idle, the CC server can originate a call to the public station, and when the station answers, extend the call to the private network destination. Further, the present invention has application to calls made between different individual private networks, e.g., a call placed by a user on a first private network to a station on a second private network.

Advantageously, the present invention provides a mechanism to achieve CCBS and CCNR services within communications networks including a mixture of public and private telephones. Particularly, the CC server in combination with the Parlay Gateway provides low cost implementation of the CCBS and CCNR service for most state of the art communications networks, in comparison to the continuous redial approach to callback. Further, the present invention achieves this with coordination of the switching equipment directly controlling the public telephone networks and private telephone networks, but without requiring the network cooperation, upgrades or conformance of intervening network equipment with advanced call control protocol standards.

Thus, using either of a data connection directly to the handset or a preferred Parlay gateway and standard Telephony Application Programming Interfaces (TAPI); the present invention coordinates public network status with private network services, e.g., Computer Supported Telephony Applications (CSTA), for improved public/private network integration in a hybrid public private network and with new features (such as CCBS and CCNR) independent of the cooperation and support of the intervening network providers. The cost of application of the present invention may be less than for a call-control protocol oriented solution, such as used in Europe. Furthermore, the present invention uses an infrastructure that expands the possibilities for other future services.

While the invention has been described in terms of preferred embodiments, those skilled in the art will recognize that the invention can be practiced with modification within the spirit and scope of the appended claims.

What is claimed is:

1. A communications network comprising:
   an enterprise private network (EPN) connected to a public communications network;
   a plurality of communications devices located at EPN stations;
   a communications server in said EPN managing communications with said plurality of communications devices; and
   a call completion (CC) server in said EPN, said CC server managing callback requests from connected said communications devices to out of network stations on said public communications network.

2. A communications network as in claim 1 further comprising:
   a gateway to said public communications network, said CC server connected through said gateway.

3. A communications network as in claim 2, wherein said gateway controls identified public communications network devices.

4. A communications network as in claim 3, wherein said gateway retrieves real-time call status information regarding selected said identified public communications network devices.

5. A communications network as in claim 4, wherein said gateway provides call activity information regarding said selected identified public communications network devices to said CC server.

6. A communications network as in claim 5, wherein said activity information includes call busy status regarding said selected ones of said identified public communications network devices to said CC server.

7. A communications network as in claim 2, wherein said gateway is a Parlay Gateway.

8. A communications network as in claim 1, wherein said public communications network includes a public wireless network and said identified public communications network devices includes at least one cell phone.

9. A communications network as in claim 1, wherein said public communications network includes a public wireless network.

10. A communications network as in claim 9, wherein said CC server connects digitally to devices on said public wireless network.

11. A communications network as in claim 10, wherein said CC server digitally connects to devices on said public wireless network using short message service messages.

12. A communications network as in claim 10, wherein said CC server digitally connects to devices on said public wireless network using an Internet protocol (IP) connection.

13. A communications network as in claim 1, wherein said public communications network includes a public switched telephone network.

14. A communications network as in claim 1, wherein at least one said communications server is a private branch exchange (PBX) server.

15. A method of managing call completion in a communications network, said method comprising the steps of:
   a) receiving a callback request;
   b) determining whether said callback request is directed to an out of network station wherein callback requests to each said out of network station identified are handled by a call completion server and wherein when said request is determined directed to an out of network station then:
      i) passing said request to said callback completion (CC) server;
      ii) acknowledging said callback request; and
      iii) requesting station status information from a public network, said out of network station being located in said public network;
   c) waiting for a status change indication at said out of network station wherein status information is provided to said callback completion (CC) server by a gateway; and
   d) connecting an in network requestor with said out of network station upon said status change indication.

16. A method as in claim 15, wherein said callback request is directed to an inactive out of network station.

17. A method as in claim 15, wherein said callback request is directed to an out of network station that is currently busy.

18. A method as in claim 15, wherein each said callback request determined directed to an in network station in the determining step (b) is handled by a private network communications server.

19. A method as in claim 18, wherein said private network communications server is a private branch exchange (PBX) server.

20. A method as in claim 15, wherein said gateway provides real time status information to said CC server in the waiting step (c).

21. A method as in claim 15, wherein the connecting step (d) comprises the steps of:
   i) contacting said in network requestor;
   ii) contacting said out of network station; and
   iii) verifying a successful connection between said in network requestor and said out of network station.

22. A method as in claim 21, wherein the connecting step (d) further comprises the step of:
   iv) stopping status change updates.

23. A method of managing call completion in a communications network, said method comprising the steps of:
   a) receiving a callback request;
   b) determining whether said callback request is directed to an out of network station wherein callback requests to each said out of network station identified are handled by a call completion server and wherein when said request is determined directed to an out of network station then:
      i) passing said request to said callback completion (CC) server;
      ii) acknowledging said callback request; and
      iii) requesting station status information from a public network, said out of network station being located in said public network;
   c) waiting for a status change indication at said out of network station wherein status information is provided to said callback completion (CC) server as a short message service (SMS) message; and
   d) connecting an in network requestor with said out of network station upon said status change indication.

24. A method of managing call completion in a communications network, said method comprising the steps of:
   a) receiving a callback request;
   b) determining whether said callback request is directed to an out of network station wherein callback requests to each said out of network station identified are handled by a call completion server and wherein when said request is determined directed to an out of network station then:
      i) passing said request to said callback completion (CC) server;
      ii) acknowledging said callback request; and
      iii) requesting station status information from a public network, said out of network station being located in said public network;
   c) waiting for a status change indication at said out of network station wherein status information is provided to said callback completion (CC) server as an Internet protocol (IP) message; and
   d) connecting an in network requestor with said out of network station upon said status change indication.

25. A method of managing call completion in a communications network, said method comprising the steps of:
   a) receiving callback requests;
   b) determining whether each of said callback requests is directed to an in network station, callback requests directed to in network stations being handled by a private network communications server; otherwise,
   c) passing call control to a call completion (CC) server;
   d) requesting call status information regarding out of network stations from a public network;
   e) waiting for a status change indication regarding said out of network stations; and for each said status change,
   f) connecting an in network requestor with one of said out of network stations.

26. A method as in claim 25, wherein ones of said callback requests are directed to inactive out of network stations.

27. A method as in claim 25, wherein ones of said callback requests are directed to out of network stations that are currently busy.

28. A method as in claim 25, wherein said private network communications server is a private branch exchange (PBX) server.

29. A method as in claim 25, wherein when call control is passed in passing step (c), said CC server directs said private network communications server to acknowledge a corresponding callback request.

30. A method as in claim 25, wherein requests for call status information in the requesting step (d) is requested through a gateway to said public network.

31. A method as in claim 30, wherein said gateway provides real time status information to said CC server in the waiting step (e).

32. A method as in claim 25, wherein status information is requested in requesting step (d) and provided in the waiting step (e) as a short message service (SMS) message.

33. A method as in claim 25, wherein status information is requested in requesting step (d) and provided in the waiting step (e) as an Internet protocol (IP) message.

34. A method as in claim 25, wherein the connecting step (f) comprises the steps of:
   i) contacting said in network requestor;
   ii) contacting said one out of network station; and
   iii) verifying a successful connection between said in network requestor and said one out of network station.

35. A method as in claim 34, wherein the connecting step (f) further comprises the step of:
   iv) stopping status change updates for said successful connection.

* * * * *